April 25, 1944.  L. C. HUFF  2,347,195
MEANS OF CONTACTING FLUID REACTANTS
Filed May 25, 1942
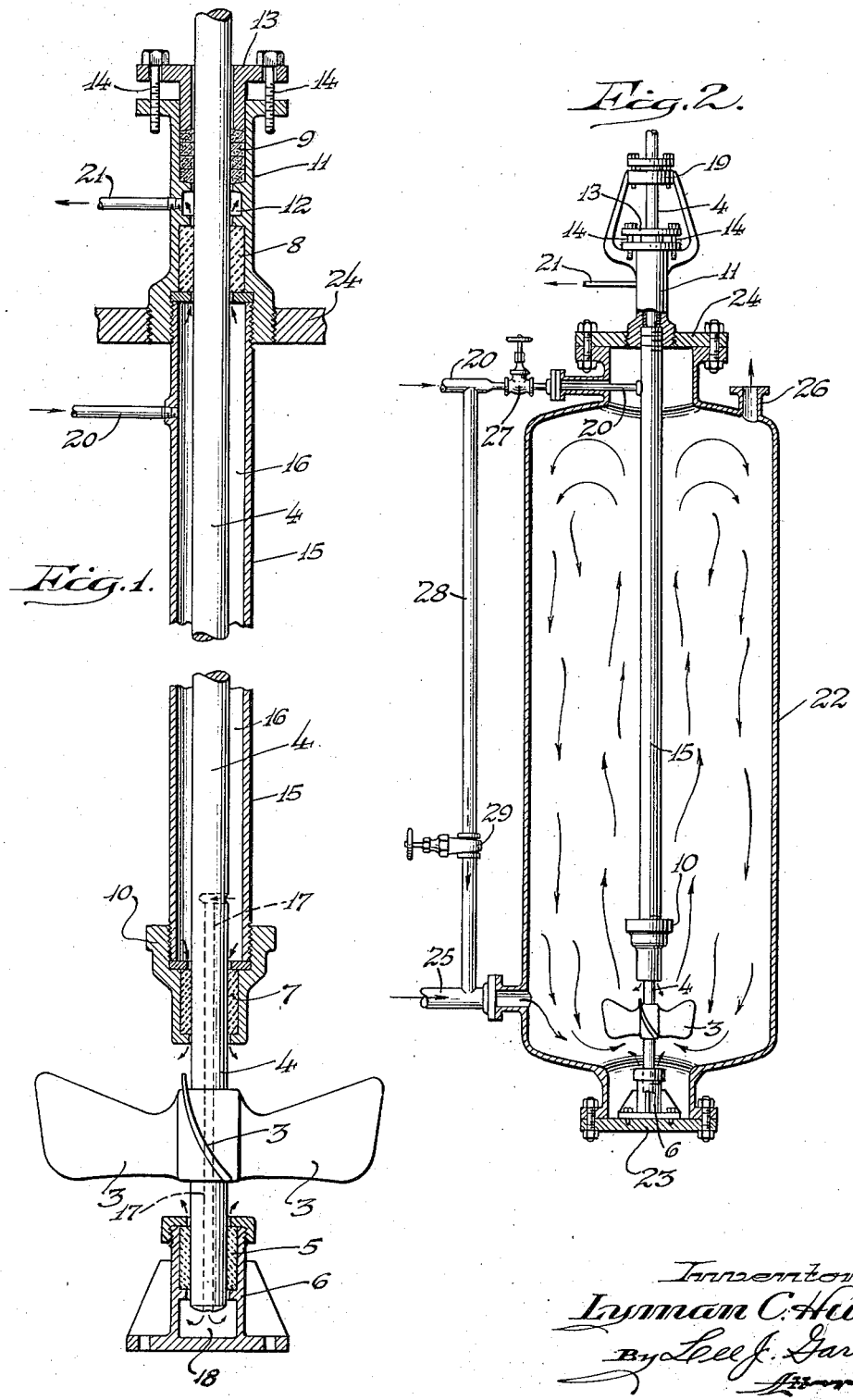
Inventor:
Lyman C. Huff
By Lee J. Gary Patented Apr. 25, 1944

2,347,195

UNITED STATES PATENT OFFICE 2,347,195

MEANS OF CONTACTING FLUID REACTANTS

Lyman C. Huff, Chicago, Ill., assignor to Universal Oil Products Company, Chicago, Ill., a corporation of Delaware Application May 25, 1942, Serial No. 444,328

9 Claims. (Cl. 259—23)

The invention relates to an improved means of obtaining mixing or intimate contact between two or more fluids.

The invention will be found useful and advantageous in a wide variety of chemical processes and in its broader aspects is not limited to use in any specific chemical reaction but is directed broadly to operations involving mixing or intimate contacting of fluids in a confined zone. However, the applicability of the apparatus is greatly enhanced by the fact that it is designed to advantageously handle hot and/or corrosive fluids at high pressure. I therefore specifically contemplate the use of my invention in conducting chemical processes employing elevated temperatures and/or pressures and in which one or more of the fluids to be commingled is hot or corrosive or both and functions either as a treating or refining agent or as one of the reactants, or as a catalyst or similar agent for promoting the desired reaction or for retarding undesired side reactions.

The now well known process of alkylating saturated with unsaturated hydrocarbons employing alkylating agents, such as sulfuric acid, phosphoric acid, hydrogen fluoride or aluminum chloride, is a good example of one of the many processes in which both the process and apparatus features of the invention may be employed to advantage.

Another such example is found in any of a wide variety of so-called "treating" processes employed for removing undesirable components from cracked distillates and other hydrocarbons or for retarding the detrimental effect of such materials. Processes of this class employ various reagents of a corrosive nature, such as sulfuric acid, hydrogen chloride, caustic soda, plumbite, copper chloride and other metal salts and the like and the features of the invention are particularly advantageous as applied to such operations.

The features and advantages of the invention will be apparent with reference to the accompanying diagrammatic drawing and the following description thereof.

Figure 1 of the drawing is an elevational view, shown principally in longitudinal section, of one specific form of mixing device embodying features provided by the invention.

Figure 2 illustrates the device of Figure 1 disposed within a closed vessel, such as a reactor. The reaction vessel is shown in longitudinal section and is provided with suitable inlet and outlet conduits for the fluid reactants and the reaction products.

Referring to the drawing and particularly to Figure 1, the apparatus here illustrated comprises an impeller 3 mounted on and adjacent one end of a rotatable shaft 4 which extends downwardly from the impeller through a bearing 5 disposed in a housing or case 6 and extends upwardly from the impeller through bearings 7 and 8 and a packing gland containing suitable packing material 9. A housing 10 is provided for the bearing 7 and, in the case illustrated, bearing 8 and packing 9 are disposed in a suitable housing 11 which also provides a confined space 12 between this bearing and the packing. An adjustable follower 13, secured to member 11 by the take-up bolts 14, is provided for compressing the packing material.

Members 10 and 11 are spaced a substantial distance apart and are connected by a tubular member or sleeve 15 extending lengthwise of and spaced from the shaft 4 and providing a confined zone 16 therebetween which communicates at its opposite ends with bearings 7 and 8.

Shaft 4 is drilled or otherwise provided at its lower end with a fluid passageway 17 through which communication is established between the space 16 within sleeve 15 and a confined space 18 provided within member 6 beneath the bearing 5 and at the lower end of the shaft, this space being in communication with bearing 5.

The device illustrated in Figure 1 is adapted to be disposed within a reactor, mixing tank or other desired vessel containing a body or pool of the fluids to be mixed or contacted, with the impeller 3 immersed in said pool or body and with all or a portion of member 11 disposed outside the vessel. Such an arrangement is illustrated in Figure 2 and will be later described.

Shaft 4 is connected at its upper end by well known means, not illustrated, with any suitable form of motivating means, such as an electric motor, fluid driven turbine or the like, not shown, and preferably a suitable outboard thrust bearing, indicated at 19 in Figure 2 and which in this instance is attached to member 11, is provided adjacent the upper end of the shaft. When desired, however, any of the bearings 5, 7 or 8 may be constructed and arranged to take the thrust of shaft 4 or a thrust-bearing may be provided within the confined space 18 of member 6, in which case shaft 4 will extend thereto and bear thereon and will be provided with lateral drilling, connecting the space 18 with the fluid passageway 17 in the shaft between the thrust bearing and bearing 5.

The construction illustrated provides protection for the bearings 5, 7 and 8, as well as packing 9, from contact with the corrosive and/or hot fluid being handled by impeller 3 and even when the mixing or reaction zone is operated at high pressure, the packing 9 need only serve to pack the shaft against relatively low pressure. To accomplish these desirable results, an auxiliary stream of fluid, which may be a portion or an ingredient of the mixture being handled by the impeller, is supplied to the space 16 within sleeve 15 through line 20 at a somewhat greater pressure than that maintained in the vessel within which the device is used. When high temperature is employed in the mixing zone, the fluid supplied to the device through line 20 is relatively cool and when the mixture handled by the impeller includes material of a corrosive nature, the fluid supplied through line 20 is of a non-corrosive or materially less corrosive nature. In some instances the material handled by impeller 3 is quite corrosive at high temperature but may be safely employed at low temperature as the fluid supplied through line 20.

Bearings 5, 7 and 8 are so fitted to shaft 4 that, under the pressure prevailing in zone 16, fluid supplied thereto through line 20 is forced between the bearings and the shaft. Fluid flows directly from zone 16 between bearing 7 and the shaft into the mixing zone above impeller 3 and another portion thereof flows through the fluid passageway 17 in shaft 4 into zone 18 within member 6 and therefrom between bearing 5 and the shaft into the mixing zone beneath the impeller. Another portion of the fluid from zone 16 flows directly therefrom between bearing 8 and the shaft into zone 12 provided within member 11 beneath packing 9, wherefrom it is discharged through line 21. Line 21 communicates with a zone of relatively low pressure as compared with that employed in zone 16 and also, when desired, as compared with that employed in the mixing zone, so that the pressure prevailing in zone 12 is relatively low and serves to materially decrease the pressure which would otherwise be exerted against packing 9. When desired, line 21 may communicate, for example, with a suitable atmospheric or low pressure storage tank, not illustrated, for the fluid supplied through line 20 to zone 16, in which case, the fluid may of course be supplied to zone 16 by a suitable pump or compressor, not shown.

Referring now to Figure 2, a mixing or contacting device, such as illustrated in Figure 1, is disposed within a reactor or any other desired closed vessel 22 with member 6 mounted on and suitably secured to flange 23, which serves as a removable closure member at the lower end of the vessel, and with member 11 disposed outside the vessel and mounted on the upper man-way flange 24, which serves as a closure member at the upper end of the vessel. Sleeve 15 is preferably of suitable size and rigidity to serve as a brace for bearing 7, as well as a means of enclosing the shaft between members 10 and 11, although this bearing may be additionally braced and retained in alignment, when desired, by securing member 10 to the walls of the vessel 22 with suitable radial arms or the like, not illustrated.

One or more of the materials to be intimately mixed or contacted in vessel 22 is supplied thereto through line 25. The vessel may be maintained substantially full of the reacting mixture or a suitable liquid level may be maintained at any desired point above the impeller. The reactants are circulated by the impeller in the general manner illustrated by the arrows, whereby they are intimately commingled and wherein the desired reaction is accomplished. The size of the vessel and the rate of flow of the reactants thereto and resulting conversion products therefrom are regulated to give the desired reaction time in the vessel. The reaction products are discharged from the vessel through the outlet connection 26 to separating and recovery equipment of any suitable form, which is not pertinent to the present invention and therefore not illustrated.

When the reaction conducted within chamber 22 is of a strongly exothermic nature, as in the case of polymerization, alkylation and the like, one or more cooling coils or other tubular fluid conduits or the like, not illustrated, may be provided within the chamber in the path of flow of the mixture passing to and from the impeller and a cooling fluid is circulated through the coils to control the reaction temperature. A heating fluid may be substituted for the cooling fluid in case the reaction being conducted is of a strongly endothermic nature. The fluid supplied through line 20 to zone 16 of the mixing device and therefrom into the reacting mixture and through line 21, as previously described, may be one or more non-corrosive ingredients of the mixture or it may be any other fluid which will serve to protect the bearings and will not adversely affect the desired reaction when commingled in small amounts with the reacting mixture. A valve 27 is provided in line 20 to control the quantity of fluid supplied therethrough to zone 16 and, in case the fluid supplied to zone 16 is an ingredient of the mixture to be reacted and it is not desired to supply all of this ingredient to the mixing zone past the bearings, a line 28 and valve 29 are provided to connect line 20, on the up-stream side of valve 27, with line 25, whereby a regulated portion of the material from line 20 may be supplied directly to the mixing zone.

In applying the features of the invention to a process for alkylating saturated hydrocarbons, such as isobutane, for example, with unsaturated hydrocarbons, such as butylenes, propylene or the like employing a corrosive alkylating agent, such as, for example, sulfuric acid or hydrogen fluoride, the saturated reactants and alkylating agent may be supplied directly to the mixing zone of chamber 22 through line 25, or a separate inlet line may be provided for the alkylating agent. All or a portion of the unsaturated reactants are supplied through line 20 and valve 27 to zone 16, another regulated portion thereof being supplied, when desired, through line 28 and valve 29 directly to the mixing zone. Alternately, a regulated quantity of the total saturated and unsaturated hydrocarbon reactants may be supplied to the mixing zone through line 25 either alone or together with the alkylating agent, while another regulated portion of the hydrocarbon mixture, without the alkylating agent, is supplied to zone 16.

Since the alkylating reaction is of a highly exothermic nature, that portion of the reactants introduced directly to the mixing zone is preferably supplied thereto at a temperature suitable for conducting the alkylating reaction, this temperature varying with the materials to be alkylated and with the alkylating agent employed and the pressure utilized in the reaction zone. The material supplied to zone 16 and therefrom into the mixing zone is preferably at a temperature below that desired for conducting the reaction when the desired reaction temperature is above 100° F., or thereabouts, so that introduction of this material into the mixing zone, in the manner previously described, serves to control or at least assist in controlling the reaction temperature by counteracting or partially counteracting the heat evolved in the exothermic reaction. As previously mentioned, suitable cooling coils or the like may also be provided within the reaction zone, when desired.

In applying the features of the invention to the treatment of hydrocarbon distillates, such as cracked gasoline, for example, with corrosive treating agents, such as sulfuric acid, caustic soda, metal salts or the like, the treating agent, either alone or with a portion of the distillate, may be supplied to the mixing zone of chamber 22 through line 25 and another portion of the distillate, without the treating agent, is supplied through line 20 to zone 16.

Any required pressure may be employed within chamber 22, ranging from sub-atmospheric to high superatmospheric pressure. In processes for the polymerization or alkylation of normally gaseous or light liquid hydrocarbons, a substantial superatmospheric pressure, sufficient to maintain the reactants in liquid phase or in dense phase resembling that of a liquid, is preferably employed in the reaction zone. On the other hand, the refining treatment of cracked distillates and other hydrocarbons is usually accomplished at substantially atmospheric pressure.

It will be apparent that at least some of the features of the invention may be employed to advantage regardless of the temperature and pressure utilized in the mixing or reaction zone when the mixture undergoing treatment therein contains materials of a corrosive nature. On the other hand, some of the features of the invention will be found advantageous regardless of the corrosive or non-corrosive nature of the material undergoing treatment when either high temperature or high pressure, or both, are employed in the mixing zone.

I claim as my invention:

1. A mixer of the class described, adapted to be immersed in a mass of fluids to be mixed, comprising, in combination, an impeller mounted on a rotatable shaft journalled in and extending through a pair of spaced bearings disposed on one side of the impeller, housing means for said bearings, a sheath spaced from and extending about the shaft between said bearings to provide a confined zone therebetween, packing means for the shaft disposed outwardly of and spaced from the bearing most remote from the impeller and in the housing thereof, providing another confined zone about the shaft between the packing and the adjacent bearing, means for introducing fluid into the first named confined zone, said bearings being so fitted to the shaft that they permit restricted flow of fluid from the first named confined space between the shaft and the bearing adjacent the impeller into the mass of fluid in which the impeller is immersed and from the first named confined zone between the shaft and the bearing adjacent the packing into the second confined zone, and means for discharging fluid thus supplied to the latter zone therefrom.

2. A mixing device of the class described, which is adapted to be immersed in a mass of fluids to be mixed, comprising, in combination, an impeller mounted on a rotatable shaft extending from opposite sides of the impeller through bearings in which the shaft is journalled, packing means for the shaft disposed outwardly from the bearing on one side of the impeller, housing means for the last named bearing and the packing which provides a confined zone therebetween about the shaft, separate housing means for the bearing disposed on the opposite side of the impeller which provides another confined zone outwardly of said bearing at the adjacent end of the shaft, the shaft having a fluid passageway therein which connects said confined zones, and means for introducing fluid into one of said confined zones and therefrom through said passageway in the shaft into the other confined zone, said bearings being so fitted to the shaft that they permit restricted flow of fluid from said confined zones between the respective bearings and the shaft into the mass of fluid in which the impeller is immersed.

3. A mixer such as defined in claim 1, wherein the impeller shaft also extends from the opposite side of the impeller and is there journalled in a third separately housed bearing, the housing for the third bearing providing another confined zone at the adjacent end of the shaft and the shaft being provided with a fluid passageway therein through which fluid may flow from the first named confined zone into the last named confined zone and therefrom between the adjacent bearing and the shaft into the mass of fluid in which the impeller is immersed.

4. An apparatus of the class described comprising, a closed vessel adapted to contain a mass of fluids to be mixed, an impeller immersed in said mass and adapted to circulate and intimately mix the fluids thereof, a rotatable shaft upon which said impeller is mounted extending therefrom and from the vessel, a bearing for the shaft disposed adjacent the impeller, another bearing for the shaft disposed outwardly of and spaced from the first named bearing, packing means for the shaft disposed outwardly of and spaced from the second bearing, housing means for the bearings and the packing extending through the wall of the vessel and comprising a sheath disposed about and spaced from the shaft between the bearings to provide a confined zone therebetween, the housing means also providing another confined zone about the shaft between the second bearing and the packing, means for introducing fluid into the first named confined zone, the bearings being so fitted to the shaft that they permit restricted flow of fluid from the first named confined zone between the shaft and the first named bearing into said mass of fluids in the vessel and between the shaft and the second bearing into the second confined zone, and means for discharging fluid thus supplied to the second confined zone therefrom.

5. A mixer such as defined in claim 4, wherein the impeller shaft also extends from the opposite side of the impeller and is there journalled in a third separately housed bearing, the housing for the third bearing providing a third confined zone at the adjacent end of the shaft, and the shaft being provided with a fluid passageway therein through which fluid may flow from the first named confined zone into the last named confined zone and therefrom between the adjacent bearing and the shaft into the mass of fluid in which the impeller is immersed.

6. An apparatus of the class described comprising a vessel, an impeller within the vessel and mounted on a rotatable shaft, a bearing for said shaft within the vessel and a housing for the bearing, a sleeve concentric with and spaced from the shaft, means for introducing fluid to the space between the shaft and sleeve, a passageway in the shaft establishing communication between said space and the housing, said bearing being fitted to the shaft to permit the flow of fluid therebetween, and means for discharging fluid from said housing into the interior of the vessel.

7. An apparatus of the class described comprising a vessel, an impeller within the vessel and mounted on a rotatable shaft, a first bearing and a second bearing for the shaft on opposite sides of the impeller, a housing for each of said bearings, said bearings and housings being disposed within the vessel, a sleeve secured to the housing of said first bearing and concentric with and spaced from the shaft, means for introducing fluid to the space between the shaft and sleeve, means permitting the flow of fluid from said space through the last-named housing into the interior of the vessel, a passageway in the shaft establishing communication between said space and the housing of said second bearing, and means for discharging fluid from the last-mentioned housing into the interior of the vessel, said bearings being fitted to the shaft to permit the flow of fluid between the bearings and the shaft.

8. A mixing device of the class described comprising, in combination, an impeller mounted on a rotatable shaft journalled in spaced bearings disposed on one side of the impeller, packing means for the shaft disposed outwardly of and spaced from the bearing most remote from the impeller, housing means for the shaft, bearings and packing providing a confined zone about the shaft between said bearings and another confined zone about the shaft between said outermost bearing and the packing, means for introducing fluid into one of said zones and means for directing fluid from said one zone into the other zone, said bearings being fitted to the shaft to permit the flow of fluid therebetween.

9. A mixing device comprising an impeller mounted on a rotatable shaft journalled in spaced bearings disposed on one side of the impeller, packing means for the shaft disposed outwardly of the bearing most remote from the impeller, a sleeve spaced from the shaft extending between the bearings and forming a confined zone about the shaft, a housing for said packing and said outermost bearing, said packing being spaced from the last-named bearings to provide a confined zone in said housing, and means for introducing fluid to one of said zones and for directing fluid therefrom to the other of said zones.

LYMAN C. HUFF.